3,388,041
HIGH DOSAGE SUSTAINED RELEASE TABLET
Eugene H. Gans, Hastings-on-Hudson, and Henry M. Apelian, Mount Vernon, N.Y., assignors to Richardson-Merrell Inc., New York, N.Y., a corporation of Delaware
No Drawing. Filed Jan. 27, 1964, Ser. No. 340,496
4 Claims. (Cl. 167—82)

ABSTRACT OF THE DISCLOSURE

Pharmaceutical tablets which release medicament over a sustained period of time are prepared by granulating a drug having a water solubility of les than about 1 percent, for example aspirin, with an organic solvent solution of 0.25 to 2.0 parts of hydroxypropyl methylcellulose and 0.25 to 2.0 parts of ethylcellulose for each 100 parts by weight of the medicament and compressing the dried granulation into tablets.

---

This invention relates to an orally administerable sustained release pharmaceutical preparation. In a particular aspect, this invention relates to a high dosage aspirin tablet designed to provide by one dosage application relief over a twelve hour span.

Aspirin is a universally accepted drug for treatment of minor pains and discomforts and for relieving the symptoms of fever and other systemic disorders. Aspirin is especially valuable for overnight relief of aches and pains which cause discomfort and impair sleep. However, repeated dosing throughout the night is necessary in order to maintain an effective therapeutic level of salicylate in the system, and this tends to defeat the effectiveness of the treatment.

Accordingly, it is a principal object of the present invention to provide a pharmaceutical preparation containing aspirin which will have both immediate and sustained therapeutic activity. Other objects and advantages will be apparent from the following description and disclosure.

To attain the objects of the present invention and to overcome the disadvantages of repeated aspirin dosing, the present invention contemplates a sustained release aspirin tablet having a two-layer laminate structure, one layer of which consists of a standard aspirin composition which disintegrates readily in the stomach and provides rapid release of about 5 grains of aspirin and the second layer is composed of a novel formulation which provides sustained release of aspirin at a rate which maintains therapeutic salicylate blood levels for a period between about eight and twelve hours. The sustained release laminate layer comprises a homogeneous granulation of aspirin and small amounts of a hydrophilic organic solvent-soluble cellulosic ether derivative blended with a hydrophobic organic solvent-soluble cellulosic ether derivative.

The rapid release portion of the tablet laminate is composed of any conventional aspirin-containing granulation which is designed to disintegrate rapidly when ingested. A particularly suitable granulation is a mixture of aspirin and starch which has been put through a granulation process.

The sustained release portion of the present invention aspirin tablet laminate is designed to maintain its solid form without disintegration when ingested and to release aspirin in a slow and sustained manner providing therapeutic salicylate blood levels over a period up to twelve hours. The slow release of the aspirin is obtained by a new and unique mechanism which is provided by the novel composition described herein.

A number of cellulosic derivatives have been used in the preparation of sustained release tablets. However, it was found that none of these prior art formulations were satisfactory in the preparation of sustained release aspirin tablets. For example, some of the prior art formulations required a large percentage of cellulosic gum and in order to provide usual dosages of aspirin suitable for maintaining effective blood levels over a twelve hour period of time, the tablets were too large. The present invention is characterized by the unusually small amount of sustained release vehicle which is necessary to accomplish the desired results. When used in the novel combination about to be described, as little as 1 percent of the cellulosic derivatives are necessary to obtain optimum results.

The advantageous properties exhibited by the sustained release portion of the present invention two-ply aspirin tablet laminate are achieved by the use of a cellulosic ether derivative which is hydrophilic and organic solvent-soluble, in combination with a cellulosic ether derivative which is hydrophobic and organic solvent-soluble.

The term "hydrophilic" as used herein in reference to cellulosic ether derivatives is intended to include those derivatives which are substantially water soluble or dispersible or hydrate readily and absorb at least their weight of water at 20° C. The term "hydrophobic" as used herein in reference to cellulosic ether derivatives is intended to include those derivatives which are substantially insoluble in water and do not hydrate and absorb their weight of water at 20% C.

By the term "organic solvent-soluble" as used herein in reference to cellulosic ether derivatives is meant a derivative which is substantially soluble at 20° C. in organic solvents such as pyridine, glacial acetic acid, ethylene chlorohydrin, furfuryl alcohol, tetrahydrofurfuryl alcohol, ethanol, acetone, and other organic solvents.

Illustrative of a suitable hydrophilic organic solvent-soluble cellulosic ether derivative is the propylene glycol ether of methylcellulose. Typical of such a product is the commercial blend of hydroxypropyl methylcellulose N.F. manufactured by The Dow Chemical Company. This material is characterized as containing both methoxy and propylene glycol ether groups substituted on the anhydroglucose units of the basic repeating cellulosic structure. This derivative is produced by the reactions of alkali cellulose first with methyl chloride, then with propylene oxide.

Illustrative of a suitable hydrophobic organic solvent-soluble cellulosic ether derivative are the thermoplastic ethyl ethers of cellulose which result from the interaction of ethyl chloride with alkali cellulose. The Dow Chemical Company produces ethylcellulose under the trade name "Ethocel."

The hydrophilic organic solvent-soluble cellulosic ether derivative and hydrophobic organic solvent-soluble cellulosic ether derivative are employed in a proportion ranging between about 0.2 and 5.0 parts of hydrophilic organic solvent-soluble cellulosic ether derivative to one part of hydrophobic organic solvent-soluble cellulosic ether derivative, in homogeneous admixture with aspirin in the sustained release portion of the aspirin tablet two-ply laminate. A particularly preferred proportion is between about 0.3 and 3.0 parts of hydrophilic cellulosic ether derivative per part of hydrophobic cellulosic ether derivative. The total quantity of hydrophilic and hydrophobic cellulosic ether excipients in proportion to the aspirin in this sustained release composition may vary between about 0.5 and 4.0 parts of cellulosic excipient per 100 parts of aspirin.

In another of its aspects, this invention contemplates a tablet consisting solely of the sustained release composition thereby providing sustained, uniform release of aspirin over a prolonged period of time. Such tablets are useful in maintaining aspirin therapy after suitable blood levels have been established.

In a preferred two-ply tablet construction, the total tablet weight will range between about 650 and 720 milligrams. In the sustained release layer of the tablet, between about 5 and 6 grains of aspirin are preferred and between about 1.75 and 14 milligrams total weight of the two cellulosic derivatives. In the rapid release layer of the tablet, between about 4.4 and 4.8 grains of aspirin are preferred and between about 2.0 and 45 milligrams of starch or other rapid release excipient. If desired, a dye may be included in either of the two layers in order to advertise the two-layer construction of the tablet.

The components of the two layers of the tablet are prepared separately by any of the well known granulation methods employed in the art. For the purposes of the present invention it is preferred to use the type of granulation known in the art as wet granulation. Granulation techniques are described in Remington's "Practice of Pharmacy," 1956.

To produce the two-ply laminate tablet of the present invention employing the two different granulation compositions, a tableting machine of conventional type can be used having a series of die-cavities and reciprocating punches. The cams of the machine are set so that each die-cavity is punched twice before the tablet is ejected. The machine should also be provided with two conventional feeding bins located at spaced positions along the path of movement of the die plate. Each die-cavity is filled with a suitable quantity of one of the granulation compositions and the punch is driven into the die recess to level the granules. The punch after withdrawal leaves the die-cavity about half filled. Then a measured quantity of the other granulation composition is charged into the unfilled portion of the die-cavity. The punch is again driven into the die-cavity compressing the second filling and the entire tablet into a firm two-ply laminate tablet.

The present invention sustained release aspirin tablets can be employed as an analgesic and antipyretic in the same manner as the standard aspirin formulations presently in use. The present invention two-ply aspirin tablets are recommended at a dosage of two tablets each eight to twelve hours for the relief of simple headache, colds, nervous tension, menstrual discomforts, pains of neuralgia and bursitis, minor aches and pains of rheumatism, muscular aches and pains, toothaches, and aches and pains following minor oral surgery.

The reactivity of the present invention two-ply sustained release aspirin tablet is characterized by quick disintegration of the rapid release laminate layer which produces a therapeutic salicylate blood level, and concomitantly, a slow release of aspirin from the sustained laminate layer which is absorbed gradually to maintain a therapeutic salicylate blood level for a period of up to twelve hours.

The following example will illustrate a specific embodiment of the present invention.

Preparation of sustained release granulation—200,000 tablets

Referring to the above tablet composition, 6 liters of S. D. alcohol is weighed into a suitable size container equipped with a high-speed, explosion-proof propeller stirrer.

Hydroxypropyl methylcellulose (0.352 kilogram) and ethylcellulose (0.352 kilogram) are mixed together. This excipient combination is slowly added to the alcohol with high speed stirring and mixed for thirty minutes to obtain a uniform suspension free of lumps. Additional alcohol is added to the suspension until the total weight of the suspension is 5.7 kilograms. The solution, when dried, forms a clear film.

The aspirin (70 kilograms) is placed in a granulator and granulation is accomplished with the granulating solution prepared above.

The wet granulation is passed through an oscillating granulator with a No. 4 screen. The granulation is spread on trays and dried until the volatile content is less than about 1.0 percent. The granulation is then passed through a No. 16 screen in the oscillating granulator and talc (0.70 kilogram) is added and blended in.

Preparation of rapid release granulation—200,000 tablets

The aspirin (60 kilograms), starch (5.76 kilograms), and FD and C No. 3 (40 grams) are placed in a mixer and passed through a Fitzpatrick mill using impact forward, No. 00 screen and medium speed. This powder mixture is transferred to a slugging press and the resulting slugs are reduced to small granules by passage through an oscillating granulator with a No. 16 mesh screen.

Tablet preparation

A layer press is employed to produce tablets at the rate of several hundred per minute or as high as several thousand per minute depending on which of the layer-press machines is employed.

The dies are filled with sustained release layer material to a weight of 357 milligrams and the layer-tamping compression pressure is adjusted so that a layer is compressed to a smooth upper surface.

The dies containing the sustained release layers are filled with rapid release granulation to form a rapid release layer weight of 329 milligrams. The layers are compressed together to obtain good bonding and sharp demarcation between the layers and to give a fracture pressure of 8 to 12 kilograms (Stokes Tester).

For preparation of tablets consisting solely of the sustained release granulation, the usual tablet production method is employed.

Tablets, when prepared in accordance with the procedure just described, will when swallowed, release approximately the normal dose of 5 grains of aspirin almost immediately. The sustained release portion of the tablet does not disintegrate immediately because of the protective action of the cellulosic derivatives which form

EXAMPLE

| Layer | Percent, w./w. | Amount Per Tablet, mg. | Ingredients |
|---|---|---|---|
| Sustained Release Layer | 51.020 | 350.00 | Aspirin, U.S.P. |
| | 0.255 | 1.75 | Hydroxypropyl methylcellulose, NF (Methocel), 60 HG, 4,000 cp. |
| | 0.255 | 1.75 | Ethylcellulose, NF (Ethocel), 20 cp. |
| | 0.510 | 3.50 | Talc, U.S.P. |
| | [1] (4.08) | [1] (28.00) | S.D. Alcohol No. 23A, 95%. |
| Total Per Layer | 52.040 | 357.00 | |
| Rapid Release Layer | 43.732 | 300.00 | Aspirin, U.S.P. |
| | 0.030 | 0.20 | FD and C Red No. 3. |
| | 4.198 | 28.80 | Starch, U.S.P. |
| Total Per Layer | 47.96 | 329.00 | |
| Total Tablet Weight | 100.0 | 686.00 | |

[1] Approximate value; material does not appear in finished product.

a film or coating over the aspirin particles. This coating, being composed of hydrophilic and hydrophobic materials, will slowly disintegrate and release the aspirin at a rate slower than that at which the aspirin would normally be dissolved. As a result of the protective action of the cellulosic derivatives, the aspirin in this part of the tablet is released but at a sufficient rate to maintain therapeutic blood levels of the salicylate in the blood stream over a period of eight to twelve hours.

Although the preferred embodiment of the tablets provides for approximately 5 grains of aspirin in the rapid release layer and slightly more in the sustained release layer, more or less aspirin can be incorporated in either one of the layers to provide tablets for special purposes. Accordingly, the rapid release layer may have from about 2.5 to 7.5 grains of aspirin whereas the sustained release layer may have from about 2.5 to 10 grains of aspirin.

The invention has been described with particular reference to aspirin, but it will be understood that other drugs or analgesics which have approximately the same water solubility as aspirin may be incorporated in the tablets with the aspirin or a substitute therefor. For example, acetylpara-aminophenol which has approximately the same solubility in water as aspirin may be used if desired. In general, any orally effective drug having a water solubility of less than about 1 percent may be used in the sustained release tablets of the present invention.

We claim:
1. A method of preparing an aspirin tablet which releases aspirin therefrom at a rate providing therapeutic salicylate blood levels over a period of eight to twelve hours when ingested orally which comprises the steps of granulating aspirin with a solution of hydroxypropyl methylcellulose and ethylcellulose in a volatile organic solvent, the amounts of each of said celluosic derivatives being between 0.25 to 2.0 parts by weight for each 100 parts by weight of aspirin in the granulation, drying said granulation until the solution when dried forms a clear film or coating over the aspirin particles having a volatile content of less than about 1 percent, screening the film-coated aspirin particles to less than 16 mesh granules and compressing said granulation into tablets.

2. An aspirin tablet prepared in accordance with the process of claim 1.

3. A method of preparing an aspirin tablet which will release an effective amount of aspirin immediately upon oral ingestion and maintain therapeutically effective blood levels of aspirin over a period of eight to twelve hours thereafter which comprises forming a granulation of aspirin with an alcoholic solution of hydroxypropyl methylcellulose and ethylcellulose, the amount of each of said cellulosic derivatives being within the range 0.25 to 2.0 parts by weight per 100 parts of the aspirin contained in said granulation, drying said granulation until the solution when dried forms a clear film or coating over the aspirin particles having a volatile content of less than about 1 percent, screening the film-coated aspirin particles to less than 16 mesh granules and compressing together a rapid release granulation layer containing starch or other rapid release excipient and 2½ to 7½ grains of granulated aspirin and a sustained release granulation layer of said cellulosic granulation containing 2½ to 10 grains of aspirin to form a two-layered laminated tablet.

4. An aspirin tablet prepared in accordance with claim 3.

References Cited
UNITED STATES PATENTS

| | | | |
|---|---|---|---|
| 3,133,863 | 5/1964 | Tansey | 167—82 |
| 3,266,992 | 8/1966 | De Jong | 167—82 |
| 2,798,443 | 7/1957 | Martell | 107—1 |
| 2,887,440 | 5/1959 | Greminger et al. | 167—82 |
| 3,115,441 | 12/1963 | Hernelin | 167—82 |

LEWIS GOTTS, *Primary Examiner.*

S. K. ROSE, *Assistant Examiner.*